United States Patent [19]
Derosa

[11] Patent Number: 5,928,729
[45] Date of Patent: Jul. 27, 1999

[54] METHOD OF TREATING A SUBSTRATE TO PROMOTE SHEDDING THEREFROM OF OIL

[75] Inventor: Ronald Jules Derosa, New Haven, Conn.

[73] Assignee: Casco Products Corporation, Conn.

[21] Appl. No.: 08/963,838

[22] Filed: Nov. 4, 1997

[51] Int. Cl.$^6$ ........................................................ B05D 3/02
[52] U.S. Cl. ........................ 427/387; 427/409; 427/412.1
[58] Field of Search ..................................... 427/387, 409, 427/412.1

[56] References Cited

U.S. PATENT DOCUMENTS 5,540,086  7/1996  Park et al. .............................. 73/53.05

OTHER PUBLICATIONS

GE Product SHC4015 Silicone Resin Solution, p. 1, Date: Pre Oct. 30, 1996.
GE Product SHP401 Solvent Solution, p. 1, Date: Pre Oct. 30, 1996.
GE Silicones, p. 1, Date: Pre Oct. 30, 1996.
Design News, Automotive Sensors 2000, Oct. 6, 1997, p. 122.

*Primary Examiner*—Erma Cameron
*Attorney, Agent, or Firm*—Mitchell D. Bittman; K. Gibner Lehmann

[57] ABSTRACT

In a preferred embodiment, a method of treating a surface of said oil level sensing device to promote the shedding of oil therefrom, including the steps of: coating the surface of said oil level sensing device with a primer and permitting the primer to dry; and then, coating the surface of said oil level sensing device with a silicone solution and curing the silicone solution on the surface of said oil level sensing device.

12 Claims, No Drawings

METHOD OF TREATING A SUBSTRATE TO PROMOTE SHEDDING THEREFROM OF OIL

BACKGROUND OF THE INVENTION

1. Field of the Invention

The present invention relates to a method of treating a substrate to promote shedding therefrom of oil generally and, more particularly, but not by way of limitation, to such a method that is especially useful in treating surfaces of oil level detection sensors.

2. Background Art

Various types of level detection sensors are employed in oil containing systems. Typically, in the past and to some extent in the present, such level detection sensors are of the float type, with the level indicated purely mechanically or by converting mechanical motion to an electrical signal. More recently, optical and electronic level detection sensors have been employed to obviate the need for moving parts and problems with contaminated oil fouling the float mechanisms.

Optical level sensors include the type in which a beam of light impinges on a lens. If the oil level is at or above the lens, the light will pass through the lens and into the liquid. If, however, the oil level is below the lens, the light beam will be reflected from the lens. Reflection or not is detected to determine oil level. Electronic sensors include the type in which oil level affects a capacitive charge on a metallic rod. In a typical engine installation, oil level is measured only at startup, since the oil pan level drops after the engine is started. With either type of device, if oil has not drained from the surface of the sensor before the reading is made, the reading will be affected.

Lubricating oil for diesel engines is prone to buildup of carbonaceous materials, such as soot, as the oil is used and this contamination causes the oil to adhere to surfaces of sensor devices. Drainage of such contaminated oil may take 10 minutes or, in some cases, the oil may never drain from the surfaces.

Accordingly, it is a principal object of the present invention to provide a method of treating a substrate to promote the shedding of oil therefrom.

It is a further object of the invention to provide such a method that is easily and economically carried out.

It is an additional object of the invention to provide such a method that can be applied to the surfaces of level sensing devices.

It is another object of the invention to provide such a method for treating the surfaces of level sensing devices that are to be used with diesel engine lubricating oil containing carbonaceous materials.

Other objects of the present invention, as well as particular features, elements, and advantages thereof, will be elucidated in, or be apparent from, the following description.

SUMMARY OF THE INVENTION

The present invention achieves the above objects, among others, by providing, in a preferred embodiment, a method of treating a surface of an oil level sensing device to promote the shedding of oil therefrom, comprising the steps of: coating said surface of said oil level sensing device with a primer and permitting said primer to dry; and then, coating said surface of said oil level sensing device with a silicone solution and curing said silicone solution on said surface of said oil level sensing device.

DETAILED DESCRIPTION OF THE PREFERRED EMBODIMENTS

The steps of the present invention are:
(1) Cleaning the substrate to be treated.
(2) Applying a primer to the substrate.
(3) Allowing the primer to dry.
(4) Applying the treatment material to the primed substrate.
(5) Curing the applied treatment material.

It has been found that a suitable cleaning material is isopropanol; however, any other cleaning material compatible with the substrate to be treated may be employed as well. Typical substrates to which the present invention may be applied include polymeric surfaces of optical level sensors and metallic surfaces of capacitive level sensors, both intended for application in level sensing of engine lubricating oil.

The primer must be effective for preparing the substrate surface to promote adhesion of the subsequently applied treatment material. The composition of the preferred primer, an acrylic polymer solution, for a variety of metallic, polymeric, and other non-metallic materials is as follows:

| Material | Approx. Weight Percent |
|---|---|
| Diacetone Alcohol | 10–30 |
| 1-Methoxy-2-Propanol | 80–99 |
| Polymethyl Methacrylate | 1–5 |
| 2-Methoxy-1-Propanol | 1–5 |

Such a material is available, for example, as Product SHC4015 supplied by GE Silicones, Waterford, N.Y.

The treating material must be effective to provide a very smooth surface to promote the rapid shedding therefrom of engine lubricating oil. The composition of the preferred treating material, a silicone solution, for a variety of metallic, polymeric, and other non-metallic materials is as follows:

| Material | Approx. Weight Percent |
|---|---|
| Methanol | 10–30 |
| Isopropyl Alcohol | 10–30 |
| N–Butyl Alcohol | 10–30 |
| Methylsilsesquioxane Resin | 10–30 |
| Water | 5–10 |

Such a material is available, for example, as Product SHP401 supplied by GE Silicones, Waterford, N.Y.

The primer solution is generally applied to the substrate at room temperature and dried, preferably by air drying.

The substrate is then dipped into the treating solution at room temperature and withdrawn therefrom over a period of from about 0.5 to about 10 minutes, depending on the desired thickness of the coating, and preferably from about one to about 4 minutes. The coating is next allowed to dry at room temperature until tack free, typically in a period of from about 10 to about 20 minutes. The coating is then cured, effective to produce a very smooth surface, at a suitable temperature of from about 245° F. to about 275° F., preferably about 260° F., for a period of at least 4 hours. The thickness of the cured coating should be in the range of about 3 to about 5 microns, preferably about 4 microns.

The silicone coating and primer used in the present invention are disclosed in the art as providing protection against deterioration from weather, including ultraviolet rays, heat, cold, rain, snow, and ice, as well as resisting damage from sand and dirt. The hard coat is disclosed as resistant against ultraviolet, abrasion, and mar, solvent/chemical, and thermal. This coating has been used on eyeglass lenses and automobile headlamps.

Silicone solutions which are cured by ultraviolet light may also be employed as treating materials.

The treatment easily and economically produces a substrate with a very robust coating from which sooty lubricating oil drains to a satisfactory degree, such draining taking place instantly up to about one minute.

It will thus be seen that the objects set forth above, among those elucidated in, or made apparent from, the preceding description, are efficiently attained and, since certain changes may be made in the above method without departing from the scope of the invention, it is intended that all matter contained in the above description shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A method of treating a surface of an oil level sensing device to promote the shedding of oil therefrom, comprising the steps of:
   (a) coating said surface of said oil level sensing device with a coat of primer and permitting said coat of primer to dry;
   (b) then, coating said coated surface of said oil level sensing device with a coat of a silicone solution having a solvent and curing said coat of silicone solution on said previously coated surface of said oil level sensing device by evaporation of the said solvent.

2. A method of treating a surface of said oil level sensing device, as defined in claim 1, further comprising: providing said primer as an acrylic polymer solution.

3. A method of treating a surface of said oil level sensing device, as defined in claim 2, further comprising: providing said acrylic polymer solution containing polymethyl methacrylate.

4. A method of treating a surface of said oil level sensing device, as defined in claim 3, further comprising: providing said acrylic polymer solution containing from about 10 to about 30 weight percent diacetone alcohol, from about 80 to about 99 weight percent 1-methoxy-2-propanol, from about one to about 5 weight percent polymethyl methacrylate, and from about one to about 5 weight percent 2-methoxy-1-propanol.

5. A method of treating a surface of said oil level sensing device, as defined in claim 1, further comprising: providing said silicone solution containing methylsilsesquioxane resin.

6. A method of treating a surface of said oil level sensing device, as defined in claim 5, further comprising: providing said silicone solution containing from about 10 to about 30 weight percent methanol, from about 10 to about 30 weight percent isopropyl alcohol, from about 10 to about 30 weight percent n-butyl alcohol, from about 10 to about 30 weight percent methylsilsesquioxane resin, and from about 5 to about 10 weight percent water.

7. A method of treating a surface of said oil level sensing device, as defined in claim 1, wherein said oil level sensing device is to be used in a diesel engine having lubricating oil with carbonaceous material therein.

8. A method of treating a surface of said oil level sensing device, as defined in claim 1, further comprising: curing said silicone solution at a temperature of from about 245° F. to about 275° F.

9. A method of treating a surface of said oil level sensing device, as defined in claim 8, further comprising: curing said silicone solution coat on said oil level sensing device at a temperature of about 260° F.

10. A method of treating a surface of said oil level sensing device, as defined in claim 8, further comprising: curing said silicone solution coat on said oil level sensing device for a period of at least about 4 hours.

11. A method of treating a surface of said oil level sensing device, as defined in claim 1, further comprising: providing said coat of silicone solution to a cured thickness of from about 3 to about 5 microns.

12. A method of treating a surface of said oil level sensing device, as defined in claim 11, further comprising: providing said coat of silicone solution to a cured thickness of about 4 microns.

* * * * *